W. J. WEST.
SHOE FOR DONKEY SLEDS.
APPLICATION FILED MAR. 27, 1918.
1,273,296.
Patented July 23, 1918.
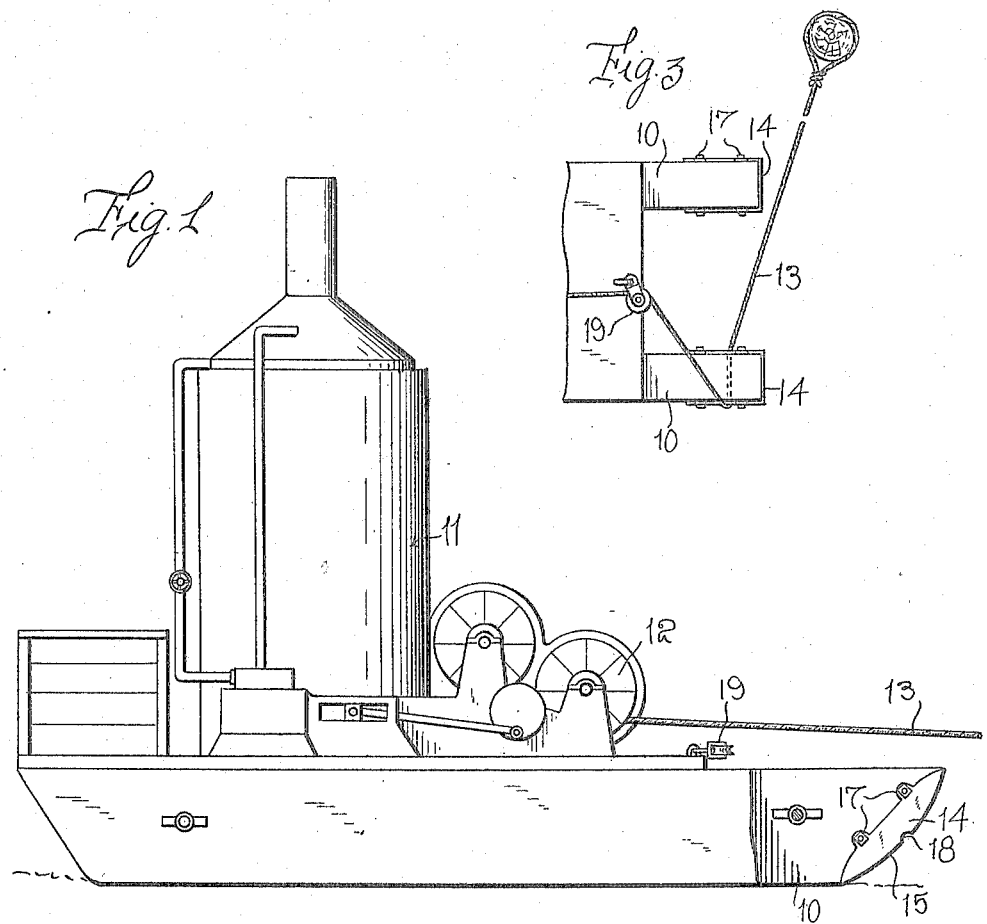
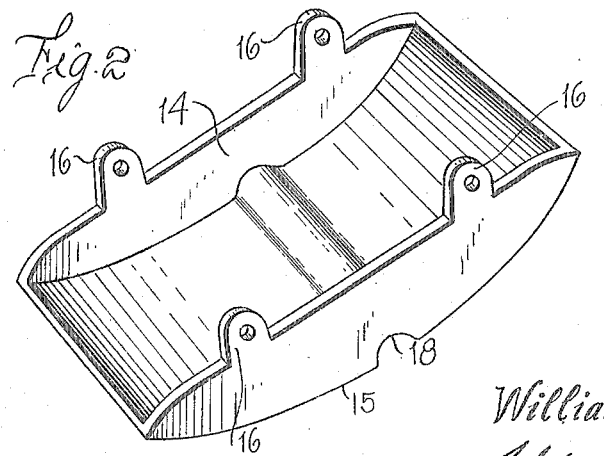
Inventor
William J. West
By Watson E. Coleman
Attorney

UNITED STATES PATENT OFFICE.

WILLIAM J. WEST, OF SEATTLE, WASHINGTON.

SHOE FOR DONKEY-SLEDS.

1,273,296.　　　　　　Specification of Letters Patent.　　Patented July 23, 1918.

Application filed March 27, 1918. Serial No. 225,032.

*To all whom it may concern:*

Be it known that WILLIAM J. WEST, a citizen of the United States, residing at Seattle, in the county of King and State of Washington, has invented certain new and useful Improvements in Shoes for Donkey-Sleds, of which the following is a specification, reference being had to the accompanying drawings.

This invention relates to sleds and particularly to tractor sleds as they may be termed, or donkey sleds, which are used in lumbering for the purpose of drawing logs out of the woods.

Donkey sleds as ordinarily used have runners formed of two logs, the forward ends of the logs being upwardly beveled or rounded, and mounted upon the body of the sled so formed is a donkey engine and a drum upon which a hauling cable is wound, the donkey engine being connected to the drum to drive it and thus wind up the cable on the drum, and haul the tractor sled and the other sleds along the roads.

The runners of the tractor sled not only have to move over very rough roads, but they strike and ride over boulders, rocks and half buried logs and stumps. As a consequence these runners at their forward ends become split, torn, and broken away. When these runners become damaged at their forward ends so as to decrease their power to move over the snow easily, they must be removed and as a matter of actual practice this requires the entire re-building of the body of the sled at a cost of approximately $150 and while the sled is being rebuilt, the donkey engine remains useless so that the cost is even greater than this.

The general object of this invention is to provide shoes for disposal upon the forward ends of the log sled runners, these shoes being readily attachable to or detachable from the runners and armoring or protecting the forward upwardly beveled end faces of the sled runners.

A further object is to form these shoes of iron or iron plates having the proper curvature or inclination to fit the logs to which they are to be applied and having ears for the passage of attaching bolts.

A further object is to form the under faces of these shoes with transversely extending grooves in which the cable is disposed when it is desired to slue the tractor slide around, these grooves engaging the cable and preventing the cable from getting under the runners of the sled and further preventing the cable from shaking or wearing the forward ends of the logs.

Other objects will appear in the course of the following description.

My invention is illustrated in the accompanying drawings, wherein:—

Figure 1 is a side elevation of a sled with my improved shoe attached thereto;

Fig. 2 is a perspective view of the shoe; and

Fig. 3 is a fragmentary top plan view showing how the shoe is turned.

Referring to these drawings, it will be seen that the donkey sled comprises two runners 10. These, as before remarked, are preferably made of logs and are connected to each other by transverse braces and beams of any suitable character so as to form the body of the sled. Mounted upon this body is the donkey engine 11 and the winding drum 12, which is operatively geared to the donkey engine to be driven thereby. A cable 13 extends from the winding drum. This cable 13 is intended to be attached to any suitable anchor in advance of the tractor sled and then by rotating the winding drum the cable will be wound up and the sled drawn along.

The forward ends of the logs are upwardly and forwardly beveled or rounded and to these ends the shoes 14 are attached. These shoes consist of iron or steel castings having any suitable width, as for instance 1½ to 2 feet and a length of 1½ to 2½ feet. These shoes have a thickness or depth of from 6 to 8 inches. The under face 15 of the shoe is rounded and the upper face of the shoe is formed with a plurality of pairs of ears 16 perforated for the passage of transverse bolts 17 whereby the shoe is attached to the log or runner. The under face of the shoe is formed with a transversely extending depression or groove 18 designed for the reception of the cable 13 when it is desired to turn the slide.

By providing the log runners with shoes of this character at their forward ends, the runners will easily ride over all obstructions such as trees, rocks and stumps without damaging the forward ends of the logs and thus the log runners will remain in proper condition for years where under ordinary circumstances they have to be replaced or a new body built after five or six months' use.

When it is desired to swing or turn the tractor sled at the bend of a road for instance, or in any other situation, the cable 13 which ordinarily passes over the pully 19 mounted on the body of the slide is carried laterally and around the forward end of one of the runners and then carried at an angle to an anchor, as for instance a stump. It is often necessary that the cable shall be carried beneath the runner and such a distance back from the extremity of the runner that it will not slip off. This, inasmuch as the sled is relatively heavy, is somewhat difficult and if the cable is simply carried over the forward upwardly beveled end of the runner it is very liable, as before stated, to slip off. Not only this, the cable wears and chafes the log runner as it is drawn over it. The purpose of the groove 18 in the bottom of the shoe is to provide a recess for the cable which will prevent the cable from slipping off of the runner and will at the same time prevent the cable from chafing the runner.

It will be obvious that the principle of my invention may be embodied in shoes having a design somewhat different from that illustrated, and therefore I do not wish to be limited to the exact details of the shoe as shown.

Having thus fully described my invention, what I claim is:—

1. A shoe for the rudders of donkey sleds adapted to be attached to the runner, the under face of the shoe being formed with a transversely extending cable receiving groove.

2. A shoe for the runners of donkey sleds comprising a relatively thick casting having a longitudinally rounded under face, the upper face of the casting being formed with a plurality of upwardly projecting attaching ears perforated for the passage of a bolt, the under face of the shoe being formed with a transversely extending cable receiving groove.

In testimony whereof I hereunto affix my signature in the presence of two witnesses.

WILLIAM J. WEST.

Witnesses:
J. P. BALL,
WM. S. C. BULL.

Copies of this patent may be obtained for five cents each, by addressing the "Commissioner of Patents, Washington, D. C."